United States Patent [19]

Rudroff

[11] Patent Number: 4,711,729
[45] Date of Patent: Dec. 8, 1987

[54] PROCESS FOR THE RECOVERY OF VALUABLE SUBSTANCES FROM LACQUER SLUDGE

[76] Inventor: Wolf-Dietrich Rudroff, Im Passkamp 44, D-4350 Recklinghausen, Fed. Rep. of Germany

[21] Appl. No.: 19,595
[22] PCT Filed: May 2, 1986
[86] PCT No.: PCT/EP86/00258
§ 371 Date: Jan. 8, 1987
§ 102(e) Date: Jan. 8, 1987
[87] PCT Pub. No.: WO86/06657
PCT Pub. Date: Nov. 20, 1986

[30] Foreign Application Priority Data
May 10, 1985 [DE] Fed. Rep. of Germany ....... 3516881

[51] Int. Cl.$^4$ .......................................... B01D 17/038
[52] U.S. Cl. ..................................... 210/781; 210/789
[58] Field of Search ............ 210/781, 787, 789, 360.1, 210/360.2

[56] References Cited

U.S. PATENT DOCUMENTS 2,704,779  3/1955  Apgar ................................. 210/787
3,994,943  11/1976  Gibble et al. ....................... 210/781

Primary Examiner—Frank Sever
Attorney, Agent, or Firm—Collard, Roe & Galgano

[57] ABSTRACT

A process is provided which proposes that the kinematic viscosity of the lacquer sludge is reduced to less than 100 cSt by adding to the sludge up to 50% by volume solvent and/or by heating it up to 60° C., and that the content of solids of the liquefied lacquer sludge is reduced to less than 3% by volume first in a decanting centrifuge with a centrifugal acceleration of up to 4,000 g, and subsequently in a centrifugal separator with a centrifugal acceleration of up to 14,000 g.

7 Claims, 1 Drawing Figure

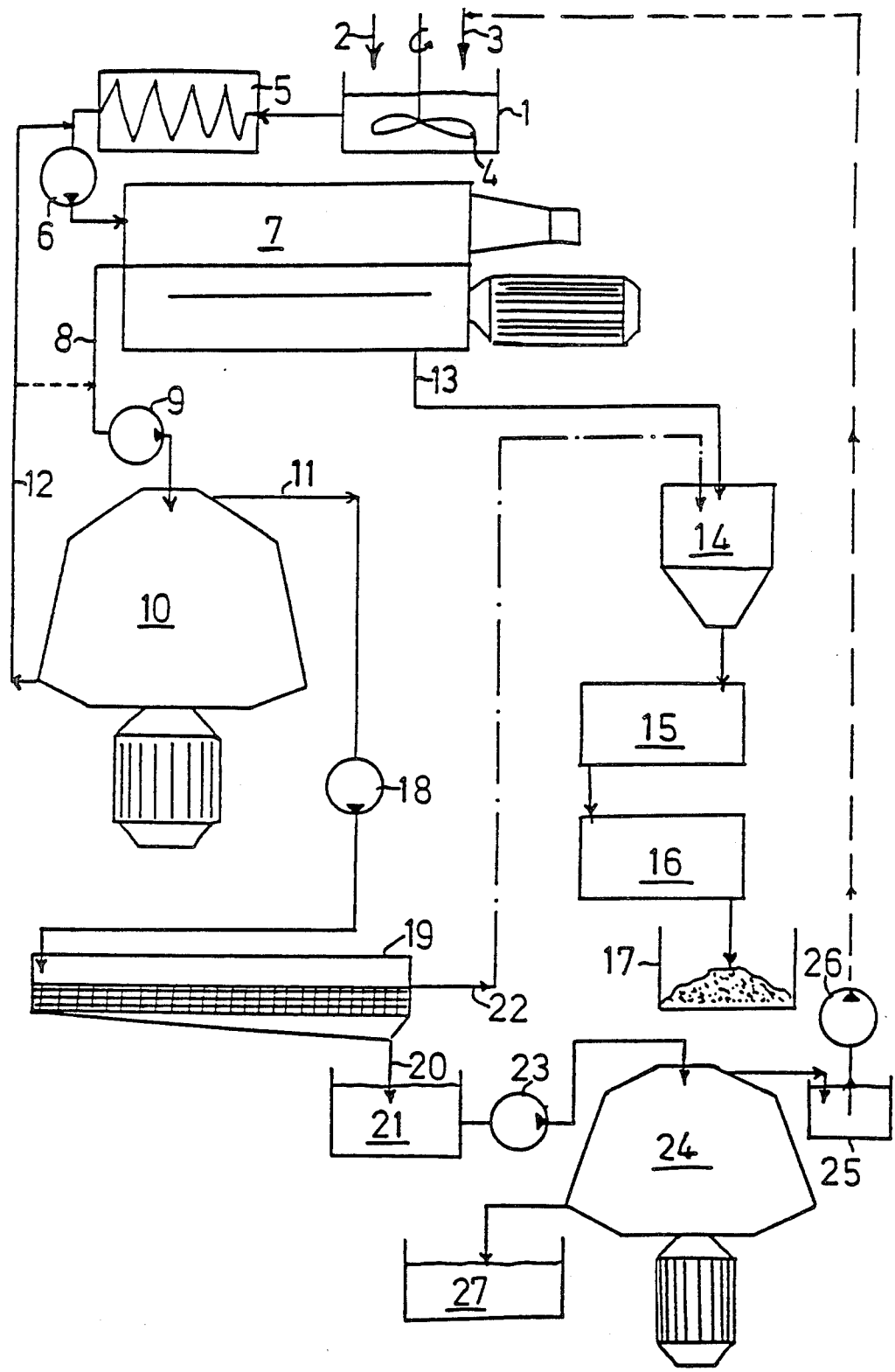

PROCESS FOR THE RECOVERY OF VALUABLE SUBSTANCES FROM LACQUER SLUDGE

The invention relates to a process for the recovery of valuable substances from lacquer sludge which, in addition to solvent, vehicle and adjuvants, contains up to 50% by volume solids in the form of inorganic and/or organic pigments and/or fillers. Such lacquer sludge is collected in great amounts in painting operations in lacquering plants in the form of so-called overspray. In the Federal Republic of Germany alone, the amount of overspray comes to approximately 150,000 tons annually.

The lacquer sludge collected in painting operations has, on the average, about the same composition as the lacquer used. Accordingly, it consists of up to about 33% vehicles (film-forming substances such as cellulose nitrate, vinyl chloride-vinyl acetate copolymer, unsaturated polyester resin, epoxide resin etc.), 27% solvents (low-, medium or high-boiling organic substances such as, for example, benzene, xylene, carbon tetrachloride, alcohol etc.), 26% pigments (finely ground organic or inorganic solids dispersed in the lacquer, which provide the lacquer with color, covering power and often also with stability), and 14% dyestuffs and fillers (for example heavy spar, chalk, kaolin etc.), as well as adjuvants (substances that enhance the properties of the lacquer with respect to processibility and stability).

As the disposal of such lacquer sludge in special waste dumps is expensive (about 400.00 German marks per ton) and the incineration of lacquer sludge poses problems due to the toxic exhaust gases and dusts released during such incineration, the search for suitable recycling methods has been on for some time now. Such a method is disclosed, for example by the Japanese published patent disclosure No. Sho 55-8810, from which it is known to dry the lacquer sludge at 100° to 250° C., recover the volatile components released in such drying step, and to grind the remaining solid mass to a granulate which, for example, can be used as an aggregate in the production of concrete. However, the value of the recovered solvent and granulate is so low that the proceeds cannot cover the additional cost of the recycling process.

If a lacquering plant is continuously operating using one and the same type of lacquer all the time in one color, it is, of course, possible to leave the overspray in the processible condition and to collect it by suitable means, dilute it with solvents and to use it again in the lacquering plant. Of course, this is not possible in lacquering plants with a changing color program, which means in the greater number of practical cases of application, as the overspray leads to a mixture of colors which, as a rule, makes reuse impossible.

Thus the objective of the invention is to recover from the lacquer sludge valuable substances with a high resale value, in particular the expensive vehicle (film-forming substances).

This objective is accomplished by the present invention, which proposes that the kinematic viscosity of the lacquer sludge is reduced to less than 100 cSt by adding to the sludge up to 50% by volume solvent and/or by heating it up to 60° C., and that the content of solids of the liquefied lacquer sludge is reduced to less than 3% by volume first in a decanting centrifuge with a centrifugal acceleration of up to 4,000 g, and subsequently in a centrifugal separator with a centrifugal acceleration of up to 14,000 g.

Although the lacquer, when produced, is compounded in such a way that the solids will not sedimentate, or do so only with difficulty, it was surprisingly found that the solids, that is, primarily the pigments, which are contained in the lacquer sludge in great amounts, can be largely removed from the lacquer sludge by relatively simple mechanical separation methods if the viscosity is reduced to a certain level and a two-stage separation process is used with certain sedimentation centrifuges, in which process especially the inorganic pigments are separated in the first stage at lower centrifugal acceleration, and the remaining pigments, which are predominantly organic, are separated subsequently in the second stage at higher centrifugal acceleration, except for a small remainder of 3% by volume at the most. The clear discharge from the centrifugal separator can be used for the production of a recycling lacquer that has a market value of from 40 to 60% of the corresponding starting product.

To satisfy higher quality requirements, another useful feature of the invention proposes that the clear discharge from the centrifugal separator is additionally subjected to a surface screen filtration with a defined pore size of 1.6 μm at the most, preferably from 0.3 to 1 μm. Such surface screen filtration permits lowering the solids content to traces that are barely measurable. The vehicle so recovered has a market value of almost 100%. The use of a filtering agent with a defined pore size assures, on the one hand, that all components of the liquid can pass through the filtering agent without obstruction, and that the risk of clogging of the filtering agent by penetrating solid particles is eliminated, on the other hand. Furthermore, the surface screen filtration takes place continuously.

Usefully, the filtering agents used are filters made of glass, in particular boron silicate glass, metal or high-polymer plastics that can be counterflushed with liquid and/or gas. Such filters have the required mechanical strength needed for pressure filtration, on the one hand, and they are sufficiently insensitive to the temperatures occurring in the process, as well as to aggressive counterflushing agents and solvents, so that the filtration system can be easily regenerated and has a sufficiently long useful life.

If the clear discharge from the centrifugal separator or the clear discharge in the surface screen filtration stage contains too many solvents for further processing, the excess amounts of solvent can be removed according to another feature of the invention.

Usefully, a centrifugal separator, too, is used for carefully separating the vehicle from the excess solvent. Surprisingly, it was found that the solvent and vehicle, too, can be effectively separated from each other with a centrifugal separator at the slightly elevated temperatures at which the process of the invention is carried out, without subjecting the vehicle to any additional thermal stresses and thus without damaging it.

As the output of solids of the centrifugal separator has a relatively low concentration especially when a jet or nozzle separator is used, such low concentration resulting from the fact that solvent-vehicle mixture is simultaneously discharged, provision is made for complete or part recirculation to the decanting centrifuge and/or centrifugal separator in order to obtain a high concentration of the solids discharge, on the one hand, and to avoid any loss of vehicle on the other hand. In this way, the vehicle and the solids separated in the centrifugal separator are jointly introduced again in the circuit and pass through the separating process once more.

So as to permit reuse of the solids for useful purposes, the same are dried and ground to a granulate that can be used as a filler for different purposes, for example as an aggregate for concrete.

An embodiment of the invention is explained in greater detail in the following by way of example with the help of the drawing showing a block diagram of the process according to the invention.

In the drawing, reference symbol 1 denotes a mixing vessel, in which the lacquer sludge 2 and a suitable solvent 3 are loaded as indicated by the arrows 2 and 3, respectively, and mixed with the help of an agitator gear 4. By diluting the mixture with up to 50% by volume, preferably 30% by volume solvent and/or heating to 60° C., preferably 35° C. in a heat exchanger 5 connected downstream of the mixing vessel, the kinematic viscosity of the lacquer sludge is reduced to less than 100 cSt, preferably from 40 to 70 cSt.

Subsequently, the lacquer sludge so liquefied by diluting and/or heating is fed from the mixing vessel to a continuously operating decanting centrifuge 7 by means of a dosing pump 6. The centrifugal acceleration of such decanting centrifuge is up to 4,000 g, preferably from 2,000 to 3,000 g. In this decanting centrifuge 7, the major portion of the irorganic pigments contained in the lacquer sludge is separated therefrom, and the clear discharge 8 of the decanting centrifuge 7 contains only clearly reduced amounts of solids. For the removal of these remaining solids, the clear discharge 8 of the decanting centrifuge 7 is passed into a centrifugal separator 10 by means of a dosing pump 9; the centrifugal acceleration of the separator 10 comes up to 14,000 g, preferably from 6,000 to 10,000 g. In the clear discharge 11 of such centrifugal separator 10, the solids content amounts to 3% by volume max., preferably from 0.1 to 1.5% by volume. With such a portion of solids, this clear discharge 11 is already usuable for the manufacture of a recycling lacquer and it has a market value of about 40 to 60%.

The solids output 12 of the centrifugal separator is connected to the infeed of the decanting centrifuge 7 and/or infeed of the centrifugal separator 10. In this way, the portions of vehicle contained in the solids output 12 is introduced again in the separating process, so that loss of vehicle is avoided, on the one hand, and a higher concentration of the solids output is obtained on the other hand.

The solids output 13 of the decanting centrifuge 7 is connected with a collecting vessel 14, from which the solids are fed to a dryer 15, the latter being followed downstream by a grinding plant 16. The solids exit from the grinding plant 16 in the form of a granulate, which is collected in a collecting vessel 17. Such granulate can be used, for example as an aggregate in the production of concrete.

If the recycling lacquer to be produced has to satisfy very high requirements, the clear discharge 11 may be subjected to after- or final purification in a surface screen filtration step, for which purpose the clear discharge 11 is passed into a screen device 19 by means of the dosing pumps 18. Such screen device 19 contains filtering agents consisting of boron silicate glass with a defined pore size of 1.6 μm at the most, preferably 0.3 to 1 μm, which filtering agents can be counterflushed with liquid and/or gas. The clear discharge 20 of such surface screen filtration stage contains only traces of solids and thus has a market value of almost 100%. It is collected in a collecting vessel 21.

The filter residue 22 of the surface screen filtration step is passed into the solids vessel 14.

If the clear discharge 20 of the screen filtration step contains too much solvent, the excess solvent is removed, for which purpose the liquid is passed from the vessel 21 to a centrifugal separator 24 by means of a disong pump 23. In such separator, a great portion of the solvent still contained in the liquid is separated in the form of a gas. The solvent gas so separated in the centrifugal separator 24 is condensed, collected in a collecting vessel 25, and passed again into the mixing vessel 1, with the help of a dosing pump 26, if need be. The final product outflow from the centrifugal separator 24 is collected in a collecting vessel 27.

If no surface screen filtration is used and the clear discharge 11 from the centrifugal separator 10 is already sufficiently pure, the additional centrifugal separator 24 also may be directly connected with the clear discharge 11, if need be. However, this variation is not shown in detail in the drawing.

So as to avoid that the added solvent is separated already in the decanting centrifuge 7 or centrifugal separator 10, these centrifuges operate in a closed system under excess pressure. The centrifugal separator 24, however, operates pressure-relieved, so that the solvent exits from the mixture in the gaseous state.

I claim:

1. A process comprising: recovering valuable substances from lacquer sludge containing in addition to solvent, vehicle and adjuvants up to 50% by volume solids in the form of inorganic and/or organic pigments and/or fillers, by reducing the kinematic viscosity of the lacquer sludge to less than 100 cSt by adding up to 50% by volume solvent and/or by heating to 60° C., providing a decanting centrifuge, reducing the solids content of the liquefied lacquer sludge to less than 3% by volume first by accelerating in said decanting centrifuge (7) up to 4,000 g, providing a centrifugal separator and subsequently accelerating in said centrifugal separator (10) up to 14,000 g.

2. Process according to claim 1, characterized in that the clear discharge (11) of the centrifugal separator is additionally subjected to a surface screen filtration with a defined pore size of 1.6 μm at the most, preferably of from 0.3 to 1 μm.

3. Process according to claim 2, characterized in that filters consisting of glass, in particular boron silicate glass, metal or high-polymer plastics are used as filtering agents, such filters being capable of counterflushing with liquid and/or gas.

4. Process according to claim 1 characterized in that the excess solvent is removed from the clear discharge (11) of the centrifugal separator (10) or from the clear discharge (20) of the surface screen filtration stage.

5. Process according to claim 4, characterized in that the separation between the vehicle and solvent is carried out in a centrifugal separator (24).

6. Process according to claim 1 characterized in that the solids output (12) of the centrifugal separator (10) is connected with the infeed of the decanting centrifuge (7) and/or the centrifugal separator (10).

7. Process according to claim 1 characterized in that the separated solids are dried and ground to a granulate.

* * * * *